IMAGE SCANNING SYSTEM
Filed Nov. 2, 1950
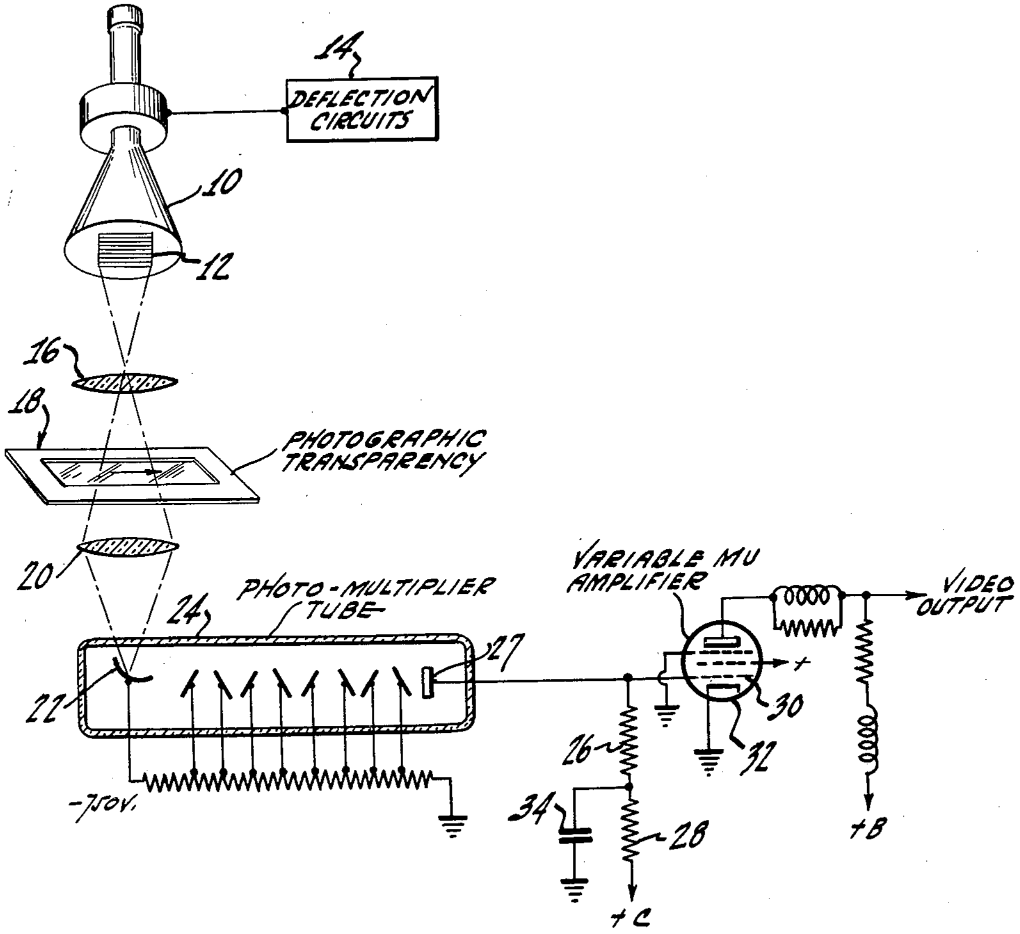
INVENTOR
VERNON J. DUKE
BY
[signature]
ATTORNEY United States Patent Office 2,764,697

Patented Sept. 25, 1956

2,764,697

IMAGE SCANNING SYSTEM

Vernon J. Duke, Rockville Centre, N. Y., assignor to Radio Corporation of America, a corporation of Delaware Application November 2, 1950, Serial No. 193,682

The terminal fifteen years of the term of the patent to be granted has been disclaimed 2 Claims. (Cl. 250—214)

The present invention relates to improvements in image scanning systems and more particularly, although not necessarily exclusively, to image scanning systems of the television variety designated for scanning photographic images such as motion picture film and the like.

As the television broadcasting art progresses more and more, use is being made of photographically recorded images to either supplement or form the entire subject matter of a television broadcast.

In order to afford maximum realism in the transmission of photographically recorded images, such as for example, motion picture film, it is desirable to provide an image scanning arrangement which maintains picture contrast fidelity substantially constant regardless of the average brightness of the scene. For example, when dealing with the television transmission of film transparencies it is found that if a photo-multiplier type flying spot scanning arrangement is used, the apparent contrast of the television image will vary in accordance with the average density of the transparency. This comes about by way of the fact that the alternating current output of the photomultiplier tube is over certain ranges a positive function of the average output current of the photo-multiplier. This average current is in turn a function of the average light intensity incident on the photomultiplier cathode. Furthermore, in practice it is found that "thinner" film transparencies have a greater contrast range than "heavier" or more dense transparencies. It can therefore be assumed, from a practical standpoint, that there exists some relation between the average brightness and the contrast of a film transparency. This is of course not rigorous in all instances. Thus, should the chemical developing processing of motion picture film be non-uniform to yield variable density development of the film, the reproduced television image would not only undesirably vary in average brightness, but also in contrast.

It is therefore an object of the present invention to provide an improved image scanning system which provides a peak to peak amplitude of output signal which more faithfully represents picture contrast regardless of the average density of the image being scanned.

It is another object of the present invention to provide an image scanning device for photographic transparencies which automatically compensates for variations in the average density of the transparencies.

It is a further purpose of the present invention to provide a television image scanning system of the photomultiplier type which automatically compensates for variations in average film density.

In the realization of the above objects and features of advantage the present invention contemplates the use of an image scanning device whose output is fed into a variable gain signal amplifier. Means are then provided for developing a control voltage which is representative of the average brightness or density of the image being scanned. The gain of the amplifier is then varied in direct accordance with the control voltage so that as the average brightness of the image beam being scanned increases, the control voltage will act to reduce the gain of the amplifier.

In one of its embodiments the present invention utilizes a flying spot scanner which includes an electron photomultiplier type tube whose output is directly coupled to the input electrode of a variable gain signal amplifier. The average D. C. potential appearing at the output of the photomultiplier tube is then made to represent the average brightness of the image being scanned so that the control voltage bias and thus the gain on the variable gain amplifier may be controlled as a negative function of the average picture brightness or transparency density.

Other objects and features of advantage of the present invention in addition to those set forth hereinabove as well as a better understanding of the operation of the present invention may be obtained through a perusal of the following description, especially when taken in connection with the accompanying drawing in which the single figure shows one embodiment of the present invention as applied to a flying spot scanner having a photomultiplier type tube.

In the drawing there is indicated at 10 a kinescope upon whose face is made to appear a flying spot scanning raster 12. Deflection of the electron beam within the kinescope 10 is accomplished by means of the deflection circuits 14. The suitable deflection circuits for the block 14 are shown in an article entitled "Television receivers" by Antony W. Wright, appearing in the March 1947 issue of the RCV Review. The flying spot raster 12 is then focused via the lens 16 onto the photographic transparency 18. Transparency 18 may be either motion picture film or slides. The light rays passing through the transparency 18 are then collected by the lens 20 and brought to bear on the photo-cathode 22 of the photo-multiplier device schematically represented as 24 in the drawing. A suitable photomultiplier tube for this purpose as well as its operation is fully described in an article entitled "An electrically focused multiplier photo tube" by J. A. Rajchman and R. L. Snyder in Electronics for December 1940. Another informative article on this type of device is entitled "The secondary image photo tube" by H. Iams and B. Salsberg appearing in the Proceedings of the IRE for January 1935. As may be expected from a photomultiplier type device, the tube 24 causes virtually no load current to pass through the resistances 26 and 28 in response to no light or heavy density transparencies. The output electrode or anode 27 of the tube 24 will then under heavy density conditions assume a more positive value with respect to ground (which may be considered as the voltage datum) than during the transmission of transparencies having less average density. As soon as a thin or less dense transparency is interposed in the optical path shown, the number of electrons emitted by the photocathode 22 becomes greater, and consequently a higher output current for the multiplier tube results. This of course causes larger voltage drop across the resistances 26 and 28 and a consequent reduction in the average voltage with respect to datum or ground potential of the anode 27.

In accordance with the present invention the output of the photo-multiplier tube 24 is galvanically or directly coupled to the control electrode 30 of the video amplifier tube 32. The cathode of the amplifier tube 32 is of course galvanically connected with the photo-cathode 22 of the multiplier tube 24 through various power supply circuit paths not shown. The output of the amplifier 32 may be conventional in form as indicated.

The operation of the present invention is substantially as follows. As the average density of the photographic transparency increases the current through the multiplier tube will decrease and the average potential developed at the anode 27 will become more positive, as described above. The alternating current output of the photo-multiplier will then also decrease. The connections of the present invention, however, will cause the gain of the amplifier tube 32 to increase due to a positive swing of the grid 30 with respect to its cathode. The resulting video signal will then appear to have a greater contrast range than would otherwise be manifest had the gain of the amplifier not been increased. This increased gain may be of a value that will compensate for the decrease in alternating current output of the photo-multiplier. The reverse action takes place in the case of a transparency having less average density. Under these conditions, the average current through the photo-multiplier tube will increase, and the voltage drop across resistors 26 and 28 will increase to produce a negative swing of the amplifier grid 30 with respect to its cathode. An undesirable increase in the alternating current signal output will also occur. However, according to the present invention the gain of the amplifier 32 will then decrease and appropriately reduce the peak to peak output amplitude of the resulting video signal.

In the case where a remote cut-off type amplifier tube is employed the voltage swing between the control electrode and its cathode will need to be somewhat greater for a given change in gain than in normal type amplifier tubes. It is for this reason that the resistance 28 is provided along with its associated by-pass capacitor 34. It will be understood that the capacitor 34 is effectively in shunt with the resistor 28, since the +C power supply to which the lower end of the resistor 28 is connected is substantially at alternating current ground potential, by reason of the fact that such power supplies conventionally include relatively large shunt filter capacitors. The resistance 28 and capacitor 34 are selected in value so as to provide the proper time constant for the automatic compensation provided by the present invention. If the time constant is too short the resulting effect, besides density compensation as described hereinabove, will be to boost the low frequency components of the video signal. If, on the other hand, the time constant is made too long the circuit will appear sluggish in its compensating action. Both of these effects are, of course, easily corrected by anyone skilled in the art.

It will be understood, although the present invention has been described in connection with the photo-multiplier type electron tube used in conjunction with the flying spot scanning system, the invention is in no way limited thereto. Any type of television scanning system, whose average output current and alternating current output varies in direct relation with the average density or brightness of the image being transmitted, may be adapted for use in conjunction with the present invention.

Moreover, it is apparent that the precise means shown for measuring the average output current of the photo tube is not restrictive of the present invention. Any means for monitoring the output current of the photo tube and controlling the gain of the following amplifier, in accordance with the value of this output current, will, of course, fall within the scope of the present invention.

Having thus described my invention, what I claim is:

1. In an image scanning system, the combination of a photomultiplier tube having an output electrode at which appears a video output signal, a power supply terminal connected to a positive potential with respect to a voltage datum, a resistance connected from said power supply terminal to said output electrode, a capacitance connected between the voltage datum and a portion of said resistance, an electron discharge tube amplifier for amplifying said video output signal, said amplifier being of the variable mutual conductance variety having at least a control electrode and cathode, a galvanic connection from said output electrode to said control electrode, and a galvanic connection from said discharge tube cathode to the voltage datum whereby amplification of said video signal output varies in accordance with the average current passed by said photomultiplier output electrode, said image scanning system at said photomultiplier providing a video signal having low and high frequency components, said capacitance with its shunt resistance providing a time constant not greater than the period of the lowest of said low-frequency video signal components.

2. In an image scanning system, the combination including a photomultiplier tube having an output electrode, a resistance, said output electrode connected to a source of positive potential through said resistance, an electron discharge tube of the remote cutoff variety having at least a control electrode and a cathode, a galvanic connection having a resistance substantially equal to zero connected between said output electrode and the control electrode of said electron discharge tube, a capacitance connected in shunt across a portion of said resistance to ground reference potential, and means connecting the cathode of said electron discharge tube to ground reference potential, the value of said capacitance taken in combination with the portion of said resistance in shunt providing a time constant longer than the period of lowest frequency provided by said photomultiplier tube.

References Cited in the file of this patent

UNITED STATES PATENTS

| | | |
|---|---|---|
| 2,050,737 | Schriever | Aug. 11, 1936 |
| 2,200,073 | Bedford | May 7, 1940 |
| 2,297,499 | Rappold | Sept. 22, 1942 |
| 2,454,169 | Haynes | Nov. 16, 1948 |
| 2,454,871 | Gunderson | Nov. 30, 1948 |
| 2,499,921 | Hurley | Mar. 7, 1950 |
| 2,534,627 | Schade | Dec. 19, 1950 |
| 2,534,668 | Gunderson | Dec. 19, 1950 |
| 2,534,932 | Sun | Dec. 19, 1950 |